United States Patent [19]

Samreus

[11] 4,044,229
[45] Aug. 23, 1977

[54] DEVICE FOR ELECTROCONDUCTIVE CONNECTION AND READING

[76] Inventor: Nikolay Samreus, 15, Kyrkogatan, Sundbyberg, Sweden, S-172 32

[21] Appl. No.: 649,076

[22] Filed: Jan. 14, 1976

Related U.S. Application Data

[62] Division of Ser. No. 380,468, July 18, 1973, Pat. No. 3,934,120.

[30] Foreign Application Priority Data

July 21, 1972 Sweden .................. 9601/72

[51] Int. Cl.² .................. G06K 7/06; G06K 19/06; G09B 7/06; H01H 43/08
[52] U.S. Cl. .................. 235/61.11 A; 35/48 A; 200/46; 235/61.12 C
[58] Field of Search .................. 35/48 A; 340/147 A; 200/46; 235/61.12 C, 61.12 R, 61.11 R, 61.11 A, 61.11 D, 61.11 E

[56] References Cited

U.S. PATENT DOCUMENTS

| | | | |
|---|---|---|---|
| 2,377,783 | 6/1945 | Hood | 235/61.11 A |
| 2,484,642 | 10/1949 | Paris | 235/61.12 C |
| 3,212,203 | 10/1965 | Atkinson | 235/61.6 E |
| 3,678,251 | 7/1972 | Delpino | 235/61.12 C |

*Primary Examiner*—Robert M. Kilgore
*Attorney, Agent, or Firm*—Kenyon & Kenyon, Reilly, Carr & Chapin

[57] ABSTRACT

A device for electrical connection of marks produced by means of an electroconductive writing substance to a readout device, by applying said marks in electroconductive relationship with pairs of mutually isolated conductive paths on at least one isolating substrate. Said substrate with its pairs of paths is removably connectable to the readout device by means of separate connection elements for each path. A mark bridges the conductive paths in one pair and closes an electric circuit on at least one substrate, whereby readout can take place without mechanical motion, and all electric circuits on such a marked substrate exist at the same time and the marks are readable electrically as well as visually.

9 Claims, 20 Drawing Figures 1 2 3
4 5 6
ꓶ 7 ꓶ
8 9 0

DEVICE FOR ELECTROCONDUCTIVE CONNECTION AND READING

This is a division of application Ser. No. 380,468, filed July 18, 1973, now U.S. Pat. No. 3,934,120.

The present invention relates to a device for electroconductive connection between a readout device and marks for reading the marks, whch are produced by means of an electrically conductive writing substance, which are also optically detectable and which represent data.

Known devices making possible such a connection for reading are usually associated with some kind of mechanical motion, the presence of a mark for instance being sensed by a movable brush or the like. Examples of such devices are found in the U.S. Pat. Nos. 2,171,556 and 3,461,276 and in the German Pat. No. 923,095. Thus, this known technique does not permit readout without mechanical motion, and it is not practically possible, to add new marks during the readout process, which is often desired with real time processing. Moreover it is necessary always to perform readout in the same sequence due to the mechanical construction used.

Other devices known, for instance according to the U.S. Pat. No. 3,678,251, permit fairly careful readout without mechanical motion, but present instead a strong restriction of the number of marks that can appear simultaneously and be read, as the device is based on the principle with analogous readout.

The invention is based on the principle of creating a connection making possible readout of marks on one or more substrates without mechanical motion.

The disadvantages associated with known technique are eliminated with a device according to the invention by measures reported in the characterizing portion of the appended claim 1.

The principle of the invention is that the readout device is connectable to electric circuits, each circuit comprising: two or more conductive paths or sheets, which are isolated from each other and are positioned on and/or in one or more isolating substrates, and two connection elements, which each makes contact with its conductive path, preferably under pressure, and via which the electric circuit is electroconductively connectable with the readout device, and one or more marks, which close the electric circuit and which are alternatively applied (a) on conductive paths on the same isolating substrate and possibly on this substrate (FIG. 1), or (b) on an isolating substrate without paths, which substrate is combined with another isolating substrate with conductive paths, which are in conductive contact by the mark (FIG. 2), or (c) on a first conductive path on an isolating substrate and partly on this substrate, in addition to which a second conductive path on another isolating substrate is in conductive contact with the first conductive path through the mark (FIG. 6), all marks to be read from the same or different substrates being included in their simultaneously present electric circuits and readout therefore taking place without mechanical motion. By mechanical motion for instance motion of substrates relative to each other or motion of the readout device relative to the substrates or vice versa is intended.

By the invention it is possible to write down marks at the same time as readout is going on. By the marks a graphical storage of data is achieved, which are legible optically as well as electroconductively, and in this way an optical as well as an electrical memory function is obtained.

The electrically conductive writing substance should have such properties that it can be applied over conductive paths and/or substrates by means of writing implements, such as a pen or a pencil, or by means of some printing method, or in other manner. After application the material should have a resistivity suitable for electrical contact.

The expression "electrically conductive paths" does not mean any restriction with regard to the shape of the paths or the method of applying them on or in the substrate. The paths can thus e.g. occur as layers, threads, fibres or points, but may also have the shape of bands, strips or sheets, all depending on the intended purpose.

Within the scope of the invention the conductive paths may also have arbitrarily reciprocal positions. However, they should be arranged so that electric circuits can be formed by their having a short distance between each other at least at the positions, where the writing substance is to be applied. This condition can be satisfied by the paths being applied on the same or different isolating substrates. The paths can for instance also be placed irregularly or be positioned in a latticed pattern or in the form of a net. However, the condition is that electric circuits are formed by means of marks and that the electric circuits are arranged so that electroconductive readout is made possible.

The invention will be described more closely below under reference to the enclosed drawings illustrating some non-binding and non-limiting examples.

Figure 1B:
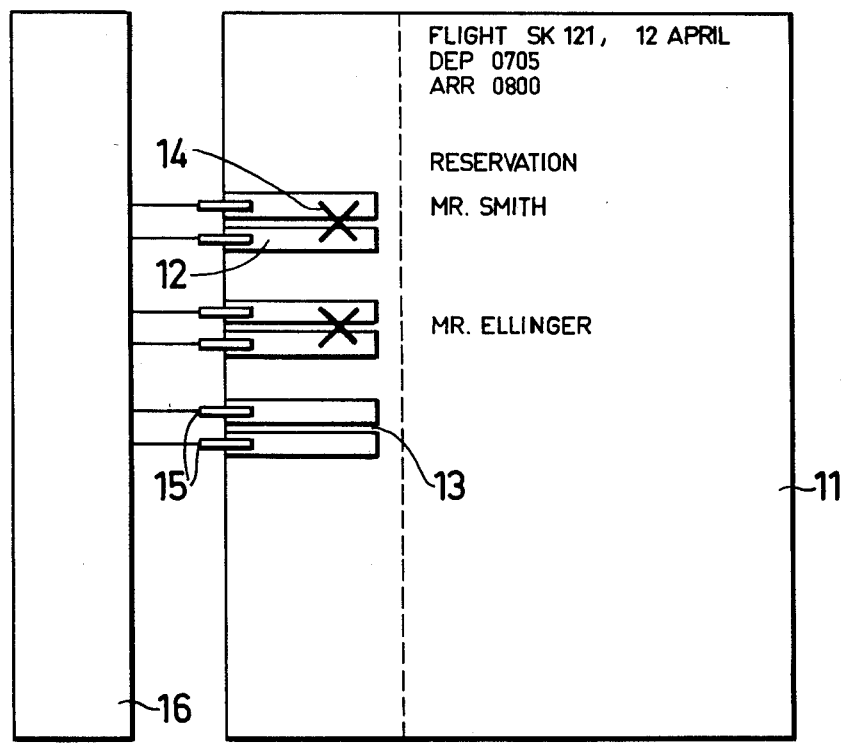
FIGS. 1a and 1b show one embodiment.
Figure 1A:
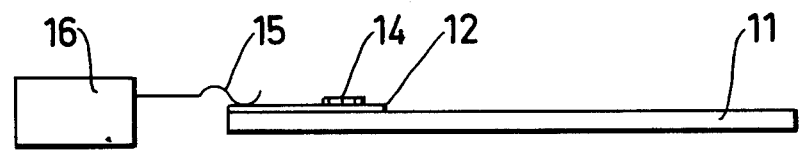

According to FIGS. 1a, 1b conductive paths 12 are positioned on an electrically isolating substrate 11. The conductive paths are electrically isolated from each other and are separated from each other on the substrate by means of an interspace 13. An electrically conductive writing substance 14 is used, which has the previously mentioned properties. It is applied so that it covers two or more conductive paths. The writing substance 14 applied is shown in the figures by means of a plan view in the form of a cross. According to FIGS. 1a, 1b the writing substance is applied over two conductive paths 12 and over the interspace 13 between these on the substrate 11. Moreover, the paths are connected with a readout device 16 for electroconductive readout via connection elements 15, which make contact, for instance under spring pressure, with portions of the conductive paths intended therefor. Thus, each electric circuit and each mark, respectively, has a sense of its own in respect of information, is separated and, possibly simultaneously with other marks on the substrate, is optically as well as electroconductively legible. In the figure an explaining text of the substrate in FIG. 1b is given as a non-binding illustrative example, which text refers to airport booking, the purpose of the marks appearing optically.

The sense of the data elements applied by marks can be of many different types. Thus, it can also indicate hotel booking or the like, and in all cases the information will be optically as well as electrically available. As data will be electrically legible according to the invention, the substrates, on which a conductive writing substance has been applied, can be used in a possible continued data processing in a conventional manner.

Figure 2A:
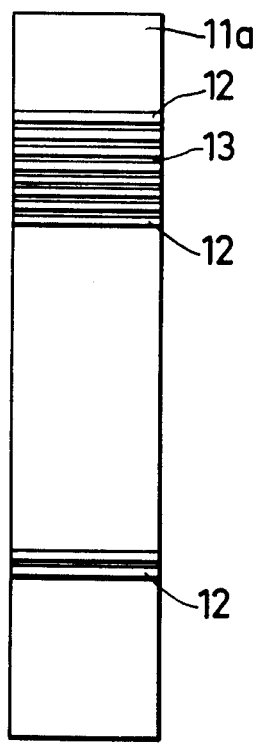
FIGS. 2a–2c show another embodiment.
Figure 2B:
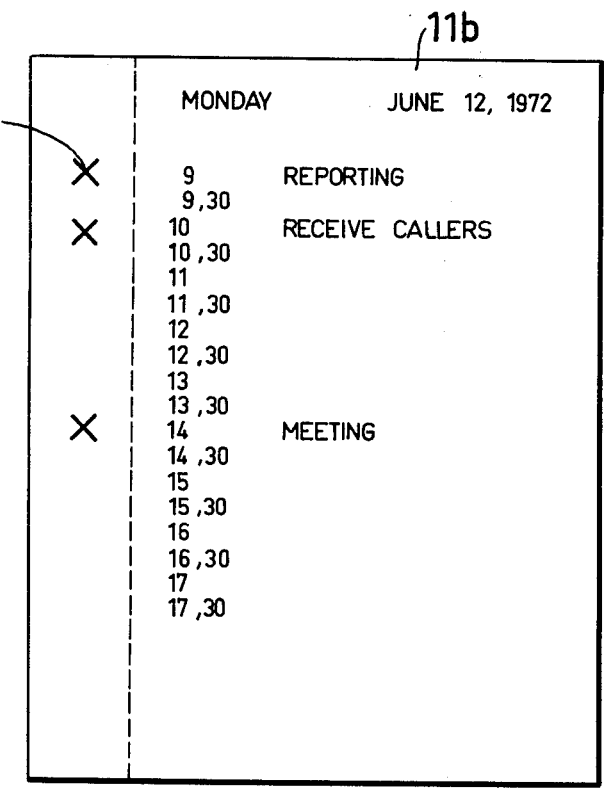
Figure 2C:
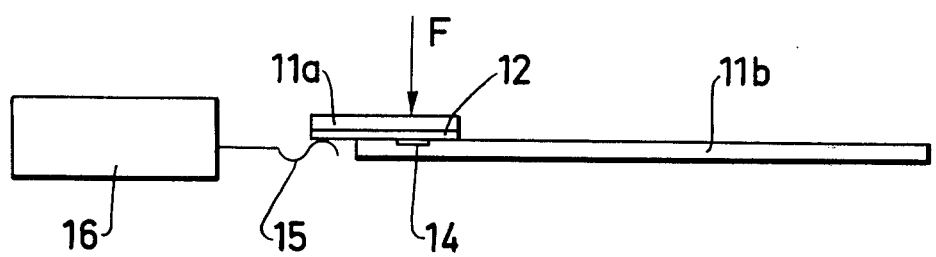

According to FIGS. 2a-2c a writing substance 14 is applied on another substrate 11b than the substrate 11a, on which the conductive paths 12 are applied. In this case the electrical connection of the conductive paths on the substrate 11a takes place by the two substrates 11a and 11b being compressed or combined with the paths 12 and the writing substance 14 turned towards each other. This state is shown in FIG. 2c, where the substrates are shown compressed with a force F.

The text on the substrate in FIG. 2b indicates an example of reception control in a hotel with points of time of occurrences, such as calling, departure and arrival. In addition to readout of information the readout device 16 can connect via a time device acoustic or optical signalling for reminding of the information content. Also at a substrate 11a applied to the substrate 11b the marks 14 can in this example be optically legible, if the substrate 11a is quite or partly made of a transparent material.

Figure 3A:
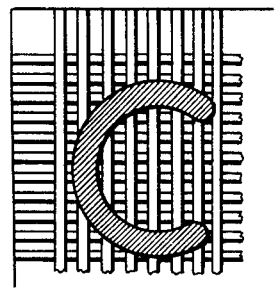
FIGS. 3a–3c show a third application.
Figure 3B:
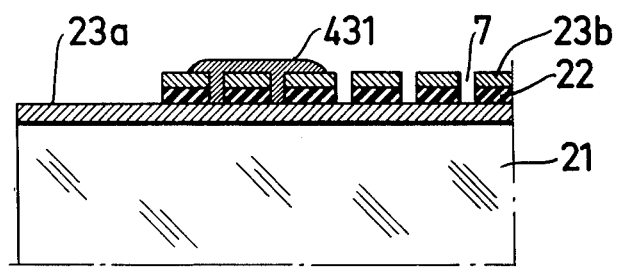
Figure 3C:
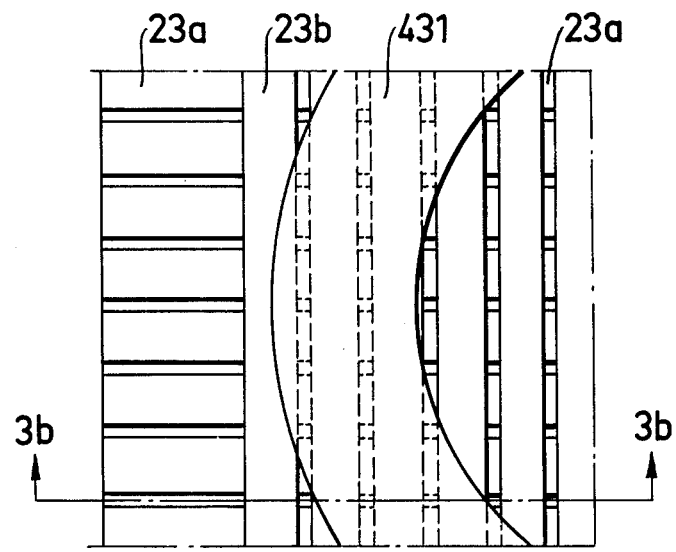

At the embodiment of the invention shown in FIGS. 3a-3c the electrical connection of the conductive paths is intended to be effected in such a way that marks of arbitrary appearance can also be written, after which readout can take place optically as well as electrically. The electrical connection is brought about by applying the writing substance 431 on conductive paths in the form of a system of coordinates in two planes and form contact points between the paths at the crossings between paths in the different planes. Conductive paths 23a, 23b which are reciprocally isolated, are arranged on a substrate 21 in two planes, the paths in the two planes being isolated from each other by an isolating layer 22. The system of coordinates in the example has perpendicular paths.

If a mark of arbitrary appearance, e.g. a C, is applied by means of a writing implement over the conductive paths, the conductive writing substance 431 will close contacts between paths in different planes, so that the mark will be electroconductively legible in coordinate representation at the same time as it is optically legible. The writing substance 431 should have a resistivity preventing erroneous reading due to longitudinal current conduction along the writing substance. It also contributes to preventing erroneous reading, if the uppermost conductive paths 23b are provided with an isolating layer on their upper surface. To the right in FIG. 3b a groove between two paths 23b is shown, which is to have an isolated upper surface, but where parts marked more strongly at the edges of the paths towards the groove and at the bottom of the groove indicate places where the writing substance makes electrical contact. In FIG. 3c also such a groove has been marked furthest to the right. Each path 23a and 23b is electrically connectable with a readout device via a connection element of its own.

Figure 4A:
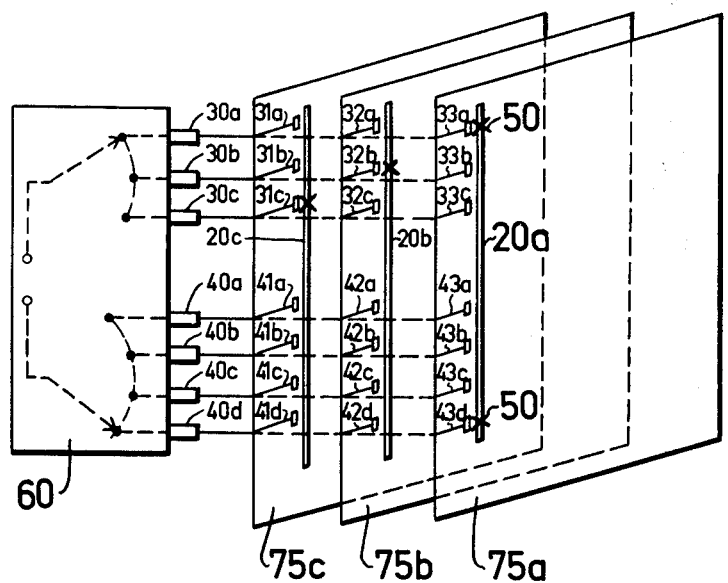
FIGS. 4a and 4b show an application with simultaneous readout from several substrates.
Figure 4B:
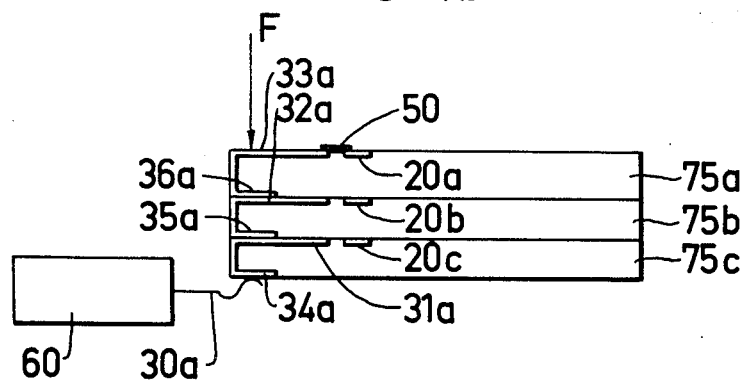

FIGS. 4a and 4b show a number of substrates 75a, 75b, 75c provided with marks, for instance paper sheets, which are to be placed on each other. On these paper sheets pre-prints may be present as in FIGS. 1 and 2 for a desired application object. Information on these paper sheets is represented by the presence of marks 50 of writing substance between a path 20a, 20b, 20c common to each sheet, and one or more conductive paths 41, 42, 43 (each a - d) reciprocally isolated, and also, as will be explained below more in detail, a sheet selecting, conductive path 31, 32, 33 (each a - c). To make possible connection of conductive paths 31, 32, 33 and 41, 42, 43 placed over each other on different paper sheets, each such path is in some way connected with a piece of conductive path 34, 35, 36 (in FIGS. 4b, 34a, 35a, 36a) located on the rear side of the sheet, at least at one of its edges, and in this way geometrically identical conductive paths on different paper sheets will be connected with each other, when the sheets lie upon each other and are exposed to contact pressure F between a connection element 30 and conductive paths 33 and 43 on the uppermost paper sheet.

By applying a writing substance 50 between the conductive paths 20 (a - c) common to each paper sheet, and the conductive paths 31, 32, 33 (a - c) adapted on the sheets, and serving as sheet selectors, for instance between the paths 20a and 33a on the sheet 75a or between the paths 20b and 32b on the sheet 75b, a paper sheet, from which information in the form of marks is to be read, can be selected electronically by means of an electronical readout device 60, which is common to all the paper sheets. Via connection elements 30 (a - c) and 40 (a - d), which are each common to all the sheets, the electronic readout device 6 is connected with the sheet selecting paths 31, 32, 33 and with the conductive paths 41, 42, 43 on each sheet supplying the information. Reading takes place by electronical switches in the readout device 60 connecting readout circuits in this with the connection elements corresponding to the desired paper sheet. If for instance the connection element 30a is connected with the readout circuits, marks on the sheet 75a will be read. In FIG. 4a two step switches are indicated in the readout device 60, of which the uppermost one connects in turn the sheets 75a - 75c, while the lower step switch is intended to read for each sheet the electric circuits with respect to marks existing there. Thus, reading of all the marks 50 can take place without mechanical motion of the electronic readout device relative to the sheets 75 and without mechanical motion of the sheets relative to each other. Thus, it is not necessary that marks to be read electrically are visually available in reading.

Figure 5A:
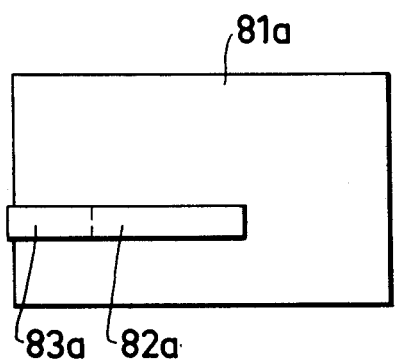
FIGS. 5a–5c show another embodiment. Other illustrative examples appear from FIGS. 6A and 6B, 7A through 7C, 8A and 8B.
Figure 5B:
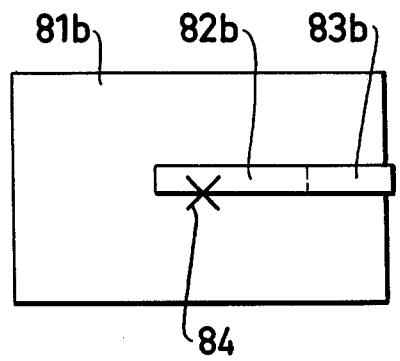
Figure 5C:
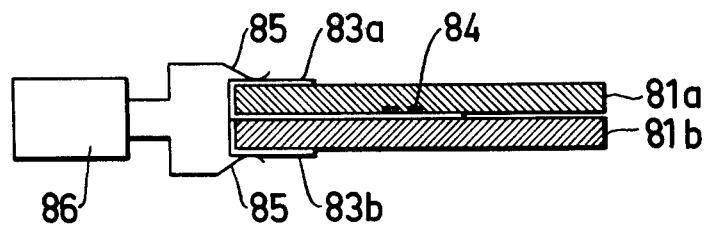

FIGS. 5a-5c show a modification of the invention. Electroconductive paths 82a, 82b are each positioned on its substrate 81a, 81b. The placement of the paths is such that they will be close to each other with an interspace for electrical isolation when the substrates are put against each other. An electrically conductive writing substance 84 can be applied on and outside the conductive path on one of the substrates, for instance according to the figure on the path 82b and the substrate 81b. When the substrates will be put together as indicated above, the writing substance applied will make contact between the conductive paths on the two substrates, as the part of the writing substance on the substrate 81b will get in contact with the conductive path on the other substrate 81a. The conductive paths can preferably continue around the edge and some way into the rear side of the substrates. This is shown in FIG. 5c as well as how one can achieve electrical connection between the paths and a readout device 86 for electroconductive reading by means of contact springs 85 as connection elements. The parts of the paths on the rear sides of the substrates are designated by 83a and 83b.

The conductive paths may for instance consist of metal applied by evaporation to a paper sheet in a desired pattern, and the marks can then be made by means of a pencil.

Figure 6A:
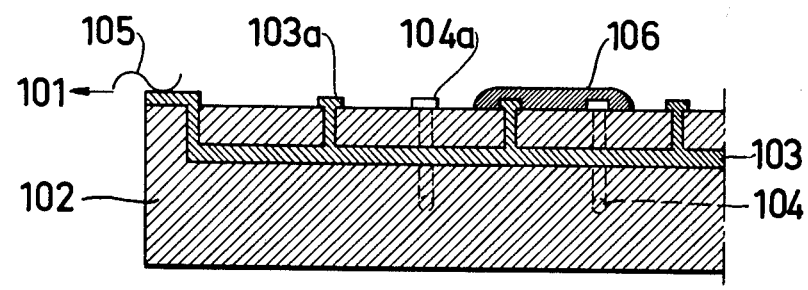
Figure 6B:
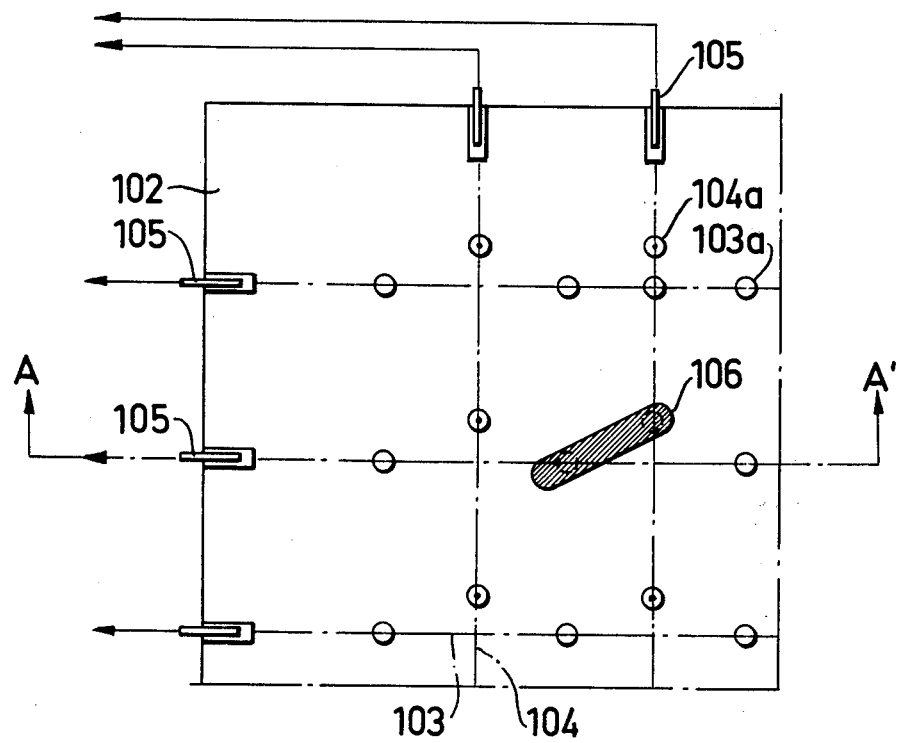

In FIG. 6 additional examples of paths positioned in different planes are shown. The paths 103 and 104 are completely embedded in the substrate 102, are isolated from each other and form a system of coordinates. The paths appear by branching for instance only on one surface of the substrate 102 in the form of points 103a and 104a, their position in the coordinate field being defined. The paths also appear on the surface for contact with the connection elements 105. An electroconductive substance applied in the form of a mark 106 closes electrically two paths belonging to the x- and y-axis, respectively, near to a point of crossing in the system of coordinates. The path points are placed near to each other in pair to make clear the position of the mark.

A variant of this embodiment is for instance if the y-paths 104 are placed completely on the surface of the substrate in the form of strips beside the points 103a. Several variables can be established in similar manner, which have the common properties that paths or their branchings, for instance 103 and 103a, belonging to the x- and y-axis, appear together on one or both of the substrate surfaces in practically any shape, to be connected by an electroconductive substance, while the other parts of the paths that are not intended for contacting, can be positioned in or on the substrate, on the other side of the substrate, in or on isolating layers which are in some way or other combined with the substrate etc. As distinguished from FIG. 3b the paths are according to FIG. 6a connected by a writing substance in one and the same plane.

Figure 7A:
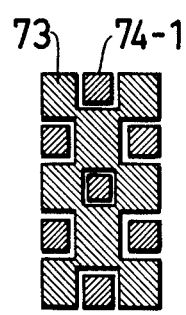
Figure 7B:
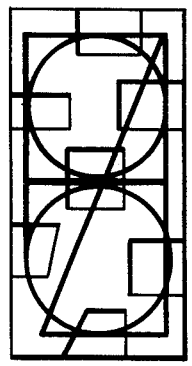
Figure 7C:
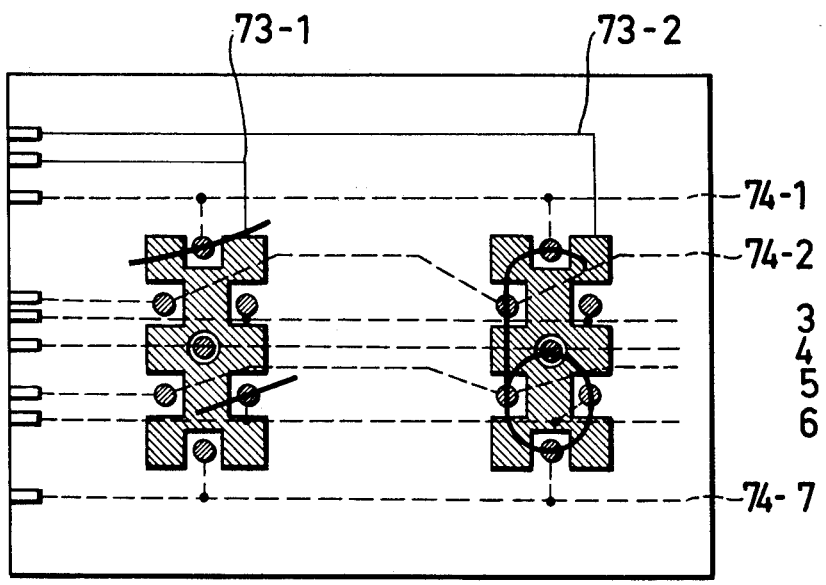

FIG. 7 shows a device for recognizing characters. It is a combination between a device with common paths and paths positioned in different planes. A common path 73 of mainly rectangular shape has a number of incisions and a central square hole. Seven character identifying paths 74(1–7) appear in the incisions and the square hole of the common path on the same surface on the substrate so near each other that a mark with an electroconductive substance can connect one or several of these identifying paths with the common path. In FIG. 7a only that part of the paths to be connected by the body line (contour line) of the character is shown, and must consequently appear on one surface of the substrate. In FIG. 7c the remaining part of the paths 74(1–7) is shown with broken lines, which means that they are positioned in the substrate or on the other side of the substrate.

All the paths are electrically isolated from each other and positioned on and/or in the substrate, for instance as in FIGS. 3 and 6, or in another manner. The paths are connectable to a readout device via connection elements. A character identifying path 74-1 and the closest part of the common path (in FIG. 7a parts marked more strongly) constitute one pair of paths, which is electrically connected by the writing substance and forms an electric circuit in a way as described above. Such a circuit is an electrical memory element. In the example here described seven identifying paths and memory elements, respectively, are included. The identifying paths are regularly spread in a two-dimensional field of coordinates and form together with the common path a memory group suitable for recognizing for instance decade digits, provided they are written in a certain size and the body line follows a certain pattern. In FIG. 7c the digit 6 is applied by means of an electroconductive writing substance on the right-hand memory field and connects the identifying paths 74-1, 2, 4, 5, 6 and 7 with the common path 73-2, forming six electric circuits. Through these six electric circuits the readout device can identify the digit 6.

In FIG. 7b the identifying paths do not have identical shape and are not symmetrically placed. Similar measures can adapt the memory field to different hand-writings. In the same figure a pattern is shown indicating how the digits (to the right of the field) are to be written. The digit 4 can be written in two different ways, 7 in several ways etc. All the characters should be written with the same size and position on the field. An increased number of identifying paths eliminates this disadvantage.

The body line of the character is thought to be divided into several sections, which extend between two adjacent pairs of paths. In FIG. 7c, where the digit 6 is applied, the body line is thought to be divided into six sections. The number of the sections and their position relative to each other in the memory group are specific to the character. The digit 9 has also six sections, but they have another position relative to each other. Several memory groups can be placed on the same substrate (FIG. 7c). The paths 74(1–7) are connected in parallel, but the common paths are separated and used as means for character searching on the substrate. By an adapted design of the readout device information written down can be read in the desired sequence or simultaneously from each of the memory elements or memory group.

The number of character identifying paths appearing in a memory group can vary with the configuration of the characters applied. The form of the common path used on the surface of the substrate can be designed as a circle, spiral, system of coordinates, net, a star with several angles, several points etc. to obtain a satisfactory resolution. As examples of applications of the device for recognizing characters automatic telephone dialling, automatic data processing etc. can be mentioned.

According to the invention the substrates, for instance paper sheets, are i.a. intended for treatment, i.e. to be provided with notes and be marked, while they are connected to the readout device. This presupposes a long line with several wires between sheet and readout device, if these are not arranged together, and is unpractical if both are positioned on a writing-table. This disadvantage is eliminated by placing the sheets on a pad that is extended for having room for the readout device or the like. The appearance of the extended pad can be compared with a handy note-book that can easily be moved. In certain cases it is necessary to connect the extended pad to other devices, for instance for data processing, and then it is important to use a minimum number of lines, which can be realized if the built-in components convert the marks into a pulse train.

Figure 8A:
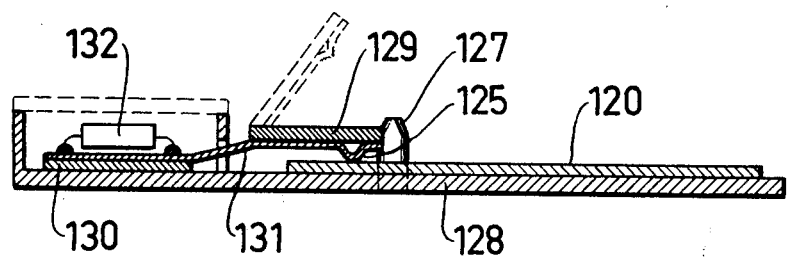
Figure 8B:
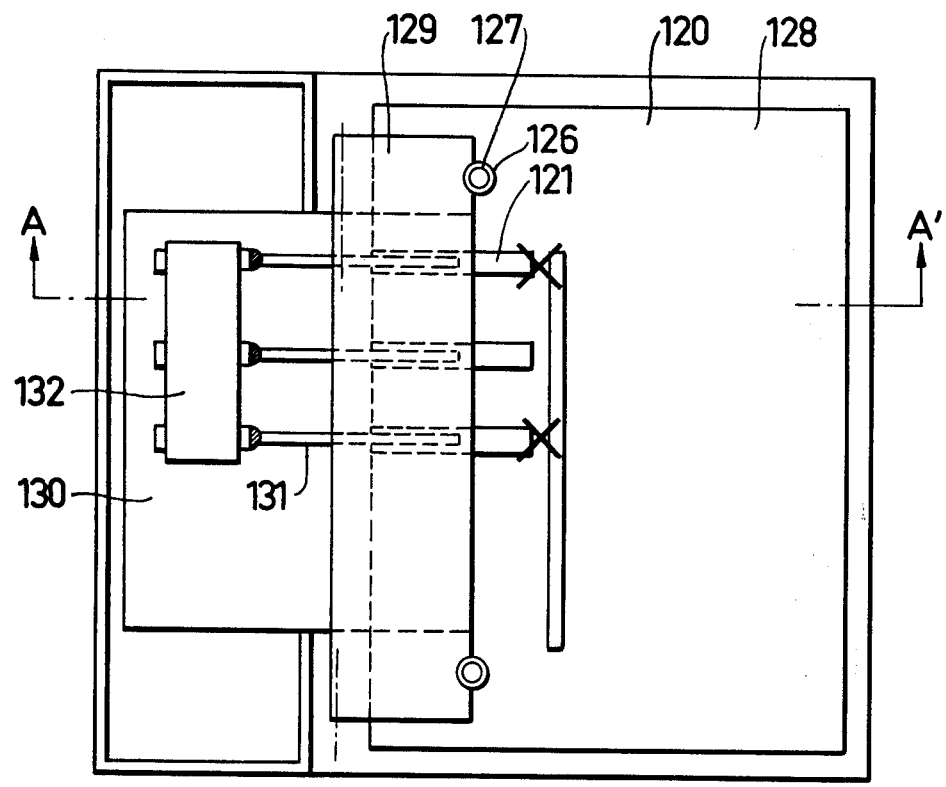

In FIG. 8 an extended pad 128 is shown, on which the sheet 120 is placed. Two holes 126 in the sheet and two guide pins 127 on the pad fix the position of the sheet and of the paths, respectively, on the pad. A foldable cover 129 on the left side of the sheet, presses by means of a spring the connection elements 125 against the sheet and the paths, respectively, to produce electrical contact and to attach the sheet simultaneously to the pad. The position of the cover relative to the sheet can be fixed by means of the same guide pins. A flexible and isolating underlayer 130 is underneath provided with printed conductors 131 and at the left hand side with printed circuits. The conductors 131 connect the active and passive components 132, forming the readout device or the like, with the connection elements 125. The part of the flexible conductors 131 carrying the connection elements 125 is bound to the cover 129 and follows its movements, while the other part with the components 132 is bound to a rigid board 133. The connection elements 125 can consist of the wire conductors 131 themselves by a special design and treatment of the conductors.

In another variant the components can be placed on the foldable cover and be directly connected to the connection elements. A third design makes it possible for the cover 129 to be stationary, while part of the pad 128 is foldable. An arrangement with one or several rolls placing the sheet in the right position and pressing the sheet against the connection elements, is a fourth variant.

Several sheets intended for separate readout can be bound to a note-block. The electrical readout of each sheet can take place by opening the block and securing the sheet in question to the connection elements.

What is claimed is:

1. A data storage retrieval memory device comprising:
   a. at least one exchangeable sheet of material which is electrical substantially non-conductive and provides a plurality of data storage positions on at least one side which can individually be coded by the presence and absence of marking material which is electrically substantially conductive at said data storage positions;
   b. a stationary pad on which said sheet is removably supported in overlying relationship providing a surface for carrying out said coding having first means with a plurality of electrical contacts for releaseably engaging said side of said sheet, said contacts including at least an individual one of said plurality of contacts directly contacting each of said storage positions to thereby contact any marking which may be placed thereon;
   c. contact means contacting all of said positions in common; and
   d. second means coupled to said plurality of contacts and said contact means providing an electrical readout device for sensing the presence and absence of said marking material at each of said data storage positions while said sheet, contacts, and contact means remain stationary with respect to each other, and said sheet is stationary on said stationary pad, said stationary relationship between said sheet, contacts, contact means and stationary pad being maintained during processing of data at all of said data storage positions on said sheet of material.

2. Apparatus according to claim 1 and further including visible data storage positions associated with said data storage positions, said visible storage positions arranged with respect to said first means so as to permit markings thereon to be visibly exposed during operation of the device so that upon response of said second means the location of a marking can be visually determined.

3. Apparatus according to claim 1 and further comprising first and second clamping supports, at least one of said clamping supports having disposed thereon said plurality of contacts and contact means whereby opening of at least one of said clamping supports will permit insertion and removal of said exchangeable sheet of material.

4. Apparatus according to claim 3 wherein said first support comprises said pad, said second support comprises a cover and means releasably pressing said cover against said pad.

5. Apparatus according to claim 4 wherein said cover is at least partially transparent to permit examining said data storage positions during operations.

6. Apparatus according to claim 5 wherein said contacts and contact means comprise a plurality of spring contacts rigidly coupled on their one side at one end to said pad and having said foldable cover rigidly secured thereto at the other end on the other side whereby said foldable cover can be lifted against the spring force of said contacts to permit inserting and removing said sheet of material, said contacts being said means releasably pressing.

7. Apparatus according to claim 1 and further including means to index said sheet of material with respect to said pad whereby said data storage positions will be aligned with said plurality of electrical contacts.

8. Apparatus according to claim 1 wherein said contact means comprise a second individual one of said contacts contacting each of said storage positions whereby two associated contacts will contact each storage position.

9. Apparatus according to claim 8 wherein said data storage positions have a defined dimension greater than the spacing between said two associated contacts whereby a conductive marking on said sheet of material will result in closing the circuit between said two associated contacts.

* * * * *